United States Patent
Eriksson et al.

(10) Patent No.: US 6,865,233 B1
(45) Date of Patent: Mar. 8, 2005

(54) METHOD AND SYSTEM FOR CONTROL SIGNALLING ENABLING FLEXIBLE LINK ADAPTATION IN A RADIOCOMMUNICATION SYSTEM

(75) Inventors: Stefan Eriksson, Stockholm (SE); Anders Furuskär, Stockholm (SE); Stefan Jäverbring, Älvsjö (SE); Mattias Wallman, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/252,989

(22) Filed: Feb. 19, 1999

(51) Int. Cl.⁷ .............................................. H04L 23/02
(52) U.S. Cl. ...................................................... 375/261
(58) Field of Search ................................ 375/261, 259, 375/316, 346

(56) References Cited

U.S. PATENT DOCUMENTS

| | | | |
|---|---|---|---|
| 4,344,171 A | 8/1982 | Lin et al. | |
| 4,422,171 A | 12/1983 | Wortley et al. | |
| 4,701,923 A | 10/1987 | Fukasawa et al. | |
| 5,577,087 A | 11/1996 | Furuya | 375/377 |
| 5,754,754 A | 5/1998 | Dudley et al. | |
| 5,781,533 A * | 7/1998 | Manning et al. | 370/236 |
| 5,822,315 A * | 10/1998 | De Seze et al. | 370/337 |
| 5,914,959 A * | 6/1999 | Marchetto et al. | 370/468 |
| 5,963,551 A * | 10/1999 | Minko | 370/356 |
| 6,009,553 A * | 12/1999 | Martinez et al. | 714/784 |
| 6,208,663 B1 * | 3/2001 | Schramm et al. | 370/465 |
| 6,278,744 B1 * | 8/2001 | Olafsson et al. | 375/296 |
| 2001/0056560 A1 * | 12/2001 | Khan et al. | 714/746 |

FOREIGN PATENT DOCUMENTS

| | | | |
|---|---|---|---|
| EP | 0 794 631 A | 9/1997 | |
| JP | 07336336 | 12/1995 | |
| WO | 96/36146 | * 11/1996 | H04L/1/12 |

OTHER PUBLICATIONS

Hanzo L. et al.; "Automatic Repeat Request Assisted Cordless Telephone"; 1995 Fourth IEEE International Conference on Universal Personal Communications, Nov. 6, 1995.
Kallel S. et al.,; "An Adaptive Incremental Redundancy Selective–Repeat ARQ Scheme for Finite Buffer Receivers"; IEEE Infocom '91; Apr. 7, 1991.

* cited by examiner

*Primary Examiner*—Mohammed Ghayour
*Assistant Examiner*—Kevin M Burd (57) ABSTRACT

Control signalling for systems employing link adaptation and incremental redundancy is described. A link adaptation/incremental redundancy message can be transmitted from a receiving entity to a transmitting entity to inform the transmitting entity of the receiving entity's incremental redundancy status or preference. Another message, which indicates whether resegmentation should be performed for retransmitted blocks can also be transmitted from a receiving entity to a transmitting entity. Both of these messages can be used by the transmitting entity to determine an appropriate modulation/coding scheme for subsequent transmissions of both original data blocks and retransmitted data blocks. The messages can be used together or independently in either link (uplink or downlink) between a base station and a mobile station in a radiocommunication system.

28 Claims, 10 Drawing Sheets

BSC = BASE STATION CONTROLLER
GMSC = GATEWAY MOBILE SWITCHING CENTER
VLR = VISITOR LOCATION REGISTER
HLR = HOME LOCATION REGISTER
SGSN = SERVING GPRS SUPPORT NODE
GGSN = GATEWAY GPRS SUPPORT NODE

| MCS OF INITIAL TRANSMISSION OF A BLOCK | POSSIBLE MCS OF RETRANSMISSIONS OF THAT BLOCK |
|---|---|
| MCS-8 (FAMILY A) | MCS-8, MCS-6, MCS-3 |
| MCS-7 (FAMILY B) | MCS-7, MCS-5, MCS-2 |
| MCS-6 (FAMILY A) | MCS-8, MCS-6, MCS-3 |
| MCS-5 (FAMILY B) | MCS-7, MCS-5, MCS-2 |
| MCS-4 (FAMILY C) | MCS-4, MCS-1 |
| MCS-3 (FAMILY A) | MCS-3 |
| MCS-2 (FAMILY B) | MCS-2 |
| MCS-1 (FAMILY C) | MCS-1 |

METHOD AND SYSTEM FOR CONTROL SIGNALLING ENABLING FLEXIBLE LINK ADAPTATION IN A RADIOCOMMUNICATION SYSTEM

BACKGROUND

The present invention generally relates to mode signalling in the field of communication systems and, more particularly, to mode signalling involving multiple modulation and coding schemes, link adaptation and incremental redundancy in digital communication systems.

The growth of commercial communication systems and, in particular, the explosive growth of cellular radiotelephone systems, have compelled system designers to search for ways to increase system capacity without reducing communication quality beyond consumer tolerance thresholds. One technique to achieve these objectives involved changing from systems wherein analog modulation was used to impress data onto a carrier wave, to systems wherein digital modulation was used to impress the data on carrier waves.

In order to provide various communication services, a corresponding minimum user bit rate is required. For example, for voice and/or data services, user bit rate corresponds to voice quality and/or data throughput, with a higher user bit rate producing better voice quality and/or higher data throughput. The total user bit rate is determined by a selected combination of techniques for speech coding, channel coding, modulation and resource allocation (e.g., for a TDMA system, the number of assignable time slots per call and for a CDMA system, the number of codes assigned to a call).

Considering first the impact of modulation, different digital communication systems have conventionally used a variety of linear and non-linear modulation schemes to communicate voice or data information. These modulation schemes include, for example, Gaussian Minimum Shift Keying (GMSK), Quadrature Phase Shift Keying (QPSK), Quadrature Amplitude Modulation (QAM), etc. Typically, each communication system operates using a single modulation scheme for transmission of information under all conditions. For example, ETSI originally specified the GSM standard to communicate control, voice and data information over links using a GMSK modulation scheme to provide transmission and retransmission of information.

Figure 1A:
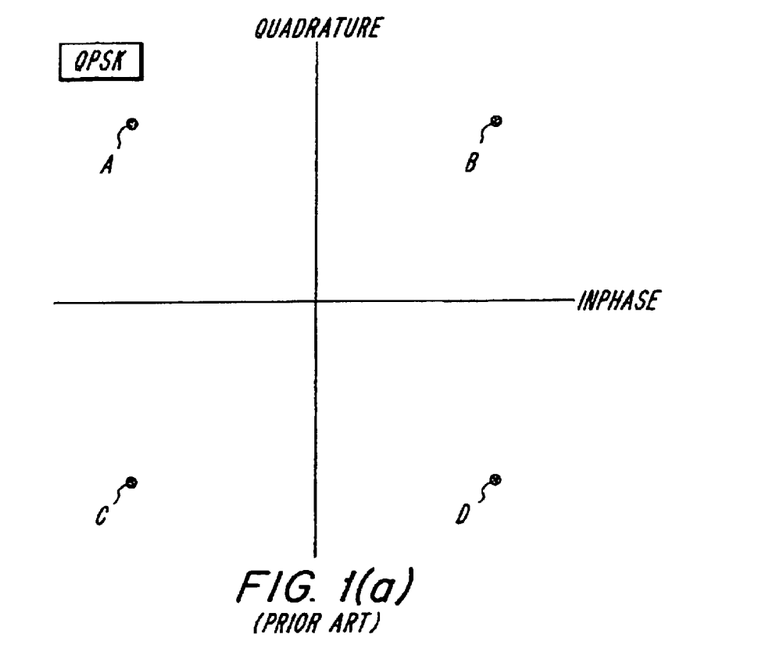
FIG. 1(a) and FIG. 1(b) are diagrams of modulation constellations for QPSK and 16QAM modulation schemes, respectively.

Depending on the modulation scheme used by a particular system, the throughput of a packet transmission scheme deteriorates differently as C/I levels decrease. For example, modulation schemes may use a different number of values or levels to represent information symbols. The signal set, i.e., amplitude coefficients, associated with QPSK, an exemplary lower level modulation (LLM) scheme, are illustrated in FIG. 1(a). By way of comparison, 16QAM is a higher level modulation (HLM) scheme having the signal set depicted in FIG. 1(b).

Figure 1B:
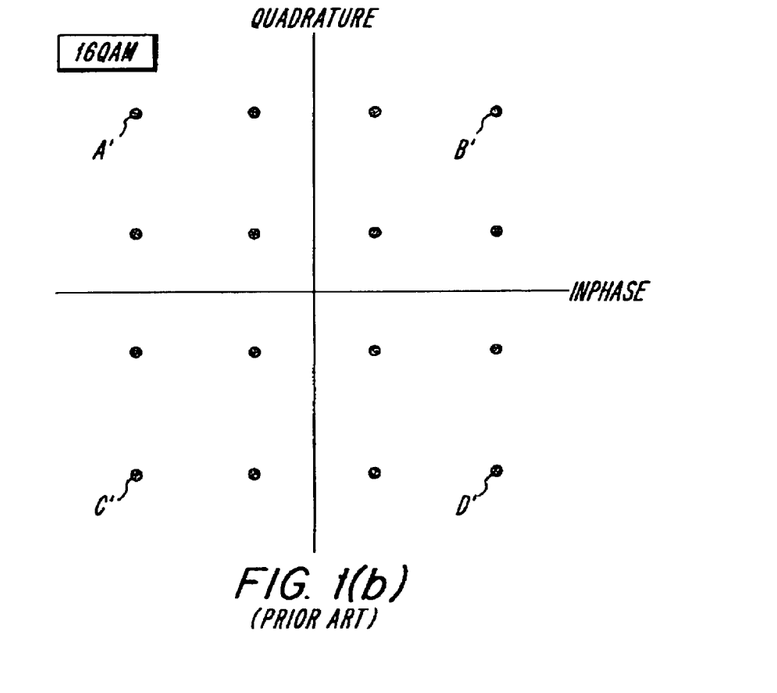

As can be seen in FIGS. 1(a) and 1(b), the minimum Euclidean distance between the coefficients in the LLM scheme is greater than the minimum Euclidean distance between coefficients in the HLM scheme for the same average signal power, which makes it easier for receive signal processing to distinguish between modulation changes in the LLM scheme. Thus, LLM schemes are more robust with respect to noise and interference, i.e., require a lower carrier-to-interference (C/I) level to achieve acceptable received signal quality. HLM schemes, on the other hand, provide greater user bit rates, e.g., 16QAM provides twice the user bit rate of QPSK, but require higher C/I levels.

More recently, however, dynamic adaptation of the modulation used for transmission in radiocommunication systems types has been considered as an alternative that takes advantage of the strengths of individual modulation schemes to provide greater user bit rates and/or increased resistance to noise and interference. An example of a communication system employing multiple modulation schemes is found in U.S. Pat. No. 5,577,087. Therein, a technique for switching between 16QAM and QPSK is described. The decision to switch between modulation types is made based on quality measurements, however this system employs a constant user bit rate which means that a change in modulation scheme also requires a change in channel bit rate, e.g., the number of timeslots used to support a transmission channel.

In addition to modulation schemes, digital communication systems also employ various techniques to handle erroneously received information, which techniques also affect the bit rate experienced by the user. Generally speaking, these techniques include those which aid a receiver to correct the erroneously received information, e.g., forward error correction (FEC) techniques, and those which enable the erroneously received information to be retransmitted to the receiver, e.g., automatic retransmission request (ARQ) techniques. FEC techniques include, for example, convolutional or block coding of the data prior to modulation. FEC coding involves representing a certain number of data bits using a certain number of code bits. Thus, it is common to refer to convolutional codes by their code rates, e.g., 1/2 and 1/3, wherein the lower code rates provide greater error protection but lower user bit rates for a given channel bit rate.

Figure 2:
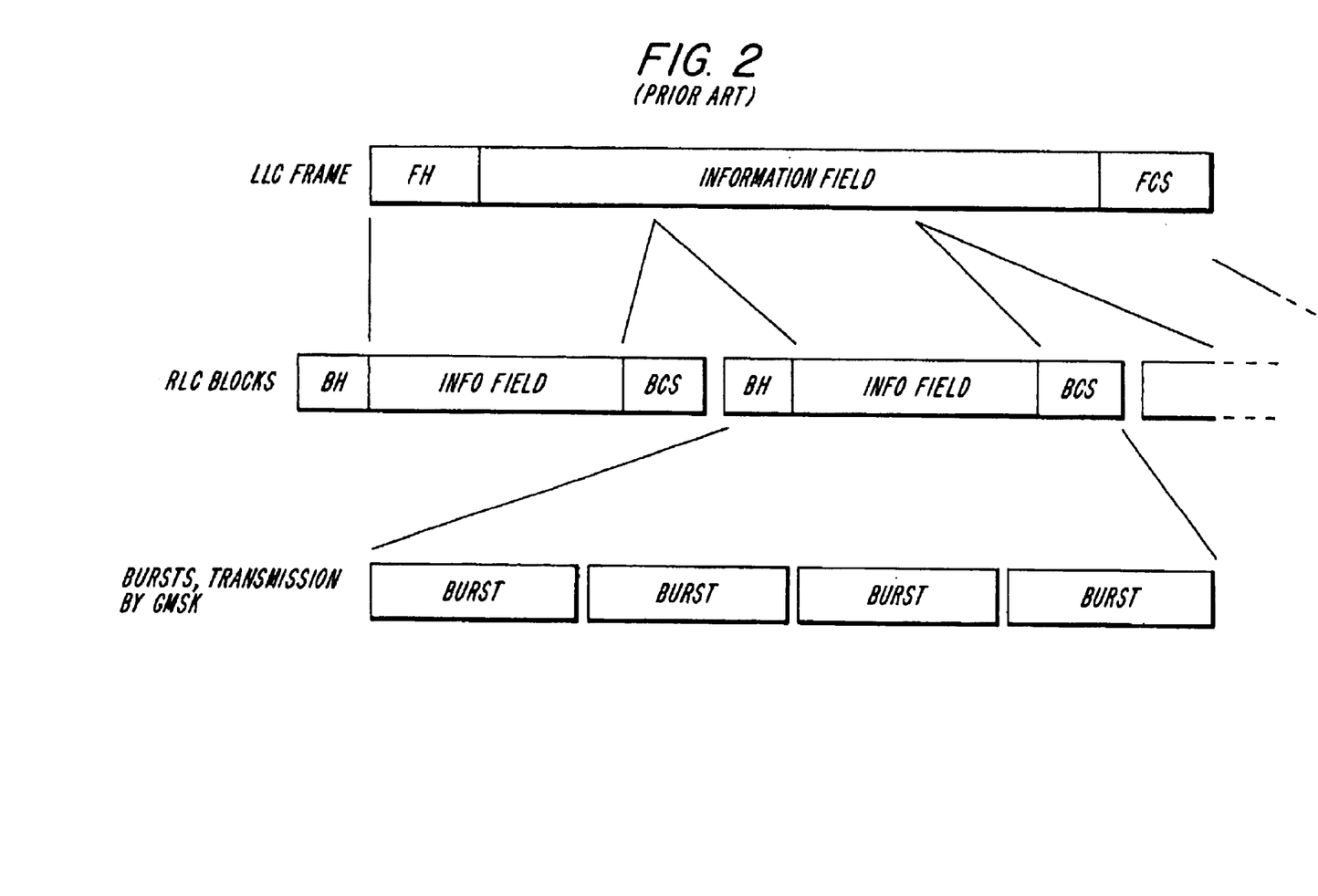
FIG. 2 depicts information mapping in a conventional system operating in accordance with GSM.

ARQ techniques involve analyzing received blocks of data for errors and requesting retransmission of blocks which contain errors. Consider, for example, the block mapping example illustrated in FIG. 2 for a radiocommunication system operating in accordance with the Generalized Packet Radio Service (GPRS) optimization which has been proposed as a packet data service for GSM. Therein, a logical link control (LLC) frame containing a frame header (FH), a payload of information and a frame check sequence (FCS) is mapped into a plurality of radio link control (RLC) blocks, each of which include a block header (BH), information field, and block check sequence (BCS), which can be used by a receiver to check for errors in the information field. The RLC blocks are further mapped into physical layer bursts, i.e., the radio signals which have been GMSK modulated onto the carrier wave for transmission. In this example, the information contained in each RLC block can be interleaved over four bursts (timeslots) for transmission.

When processed by a receiver, e.g., a receiver in a mobile radio telephone, each RLC block can, after demodulation, be evaluated for errors using the block check sequence and well known cyclic redundancy check techniques. If there are errors, then a request is sent back to the transmitting entity, e.g., a base station in a radiocommunication system, denoting the block to be resent using predefined ARQ protocols. The variation of both modulation and FEC schemes (referred to herein jointly as "modulation/coding schemes" or "MCS") to provide link adaptation in conjunction with ARQ is described, for example, in U.S. patent application Ser. No. 08/921,318, entitled "A Method for Block ARQ with Reselection of FEC Coding and Modulation", filed on Aug. 29, 1997, the disclosure of which is incorporated here by reference.

Strengths and weaknesses of these two error control schemes can be balanced by combining FEC and ARQ techniques. Such combined techniques, commonly referred to as hybrid ARQ techniques, permits correction of some received errors using the FEC coding at the receiver, with other errors requiring retransmission. Proper selection of FEC coding schemes with ARQ protocols thus results in a hybrid ARQ technique having greater reliability than a system employing a purely FEC coding scheme with greater throughput than a system employing a purely ARQ-type error handling mechanism.

An example of a hybrid ARQ scheme can be found in GPRS. The GPRS optimization provides four FEC coding schemes (three convolutional codes of different rate and one uncoded mode). After one of the four coding schemes is selected for a current LLC frame, segmentation of this frame to RLC blocks is performed. If an RLC block is found to be erroneous at the receiver (i.e., it has errors which cannot be corrected) and needs to be retransmitted, the originally selected FEC coding scheme is used for retransmission, i.e., this system employs fixed redundancy for retransmission purposes. The retransmitted block may be combined with the earlier transmitted version in a process commonly referred to as soft combining in an attempt to successfully decode the transmitted data.

Figure 3:
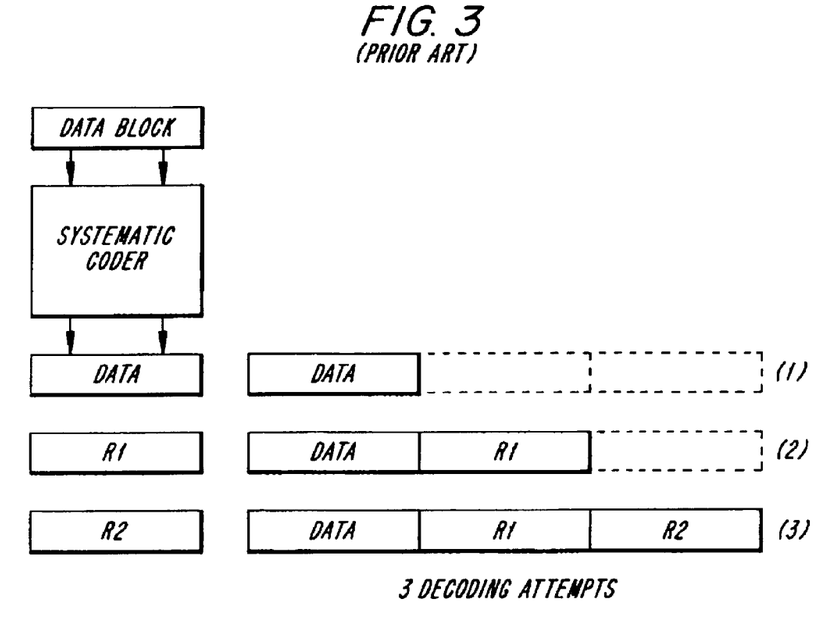
FIG. 3 illustrates a conventional variable redundancy technique.

Another proposed hybrid ARQ scheme, sometimes referred to as incremental redundancy or type-II hybrid ARQ, provides for additional redundant bits to be transmitted if the originally transmitted block cannot be decoded. This scheme is conceptually illustrated in FIG. 3. Therein, three decoding attempts are made by the receiver. First, the receiver attempts to decode the originally received data block (with or without redundancy). Upon failure, the receiver then receives additional redundant bits R1, which it uses in conjunction with the originally transmitted data block to attempt decoding. As a third step, the receiver obtains another block of redundant information R2, which it uses in conjunction with the originally received data block and the block of redundant bits R1 to attempt decoding for a third time. This process can be repeated until successful decoding is achieved.

As compared with link adaptation, incremental redundancy does not require that link quality estimates be transmitted or used. However, one problem with this technique is the large memory requirement associated with storing the data block (and possibly additional blocks of redundant bits) until a successful decode occurs, which storage is needed since the subsequently transmitted redundancy blocks (e.g., R1 and R2) cannot be independently decoded to give the same performance as if combined decoding was used. The storage requirements are further increased if the receiver stores a multi-bit soft value associated with each received bit, the soft values indicating a confidence level associated with the decoding of the received bit.

Many variations and combinations of these techniques are possible. For example, it is possible to combine link adaptation with incremental redundancy. This results in an incremental redundancy scheme wherein the MCS of the first transmission can be varied, e.g., such that the first transmission is made using some channel coding or not the least robust modulation. In such a combination, the MCS can be changed for many reasons, e.g., to reduce the number of retransmissions or delay or to dynamically adapt to changes in memory requirements.

MCS changes may or may not be based solely on reported link quality estimates. For example, when incremental redundancy is used and the receiver has limited memory it may be beneficial to increase the robustness of the MCS even though (in a system with unlimited memory) it would decrease throughput. Consider the following scenario. Using a less robust MCS, the number of required retransmissions for successful incremental redundancy combination will be higher. This, in turn, requires a lot of memory. If the receiver runs out of memory, it will begin to discard received blocks that have previously been stored for later incremental redundancy combination. Since the information transmitted using the relatively unrobust MCS probably relies in part upon incremental redundancy combining to achieve acceptable decoding performance, the result may be significantly degradation in received signal quality. Hence it may be better under such circumstances to dynamically increase the robustness of the transmission's MCS, e.g., when the receiver starts to run out of memory.

Yet another factor which further complicates this process is the possibility of changing the MCS associated with blocks that are being retransmitted. If link adaptation is used without incremental redundancy, then changing the MCS for retransmissions may be very desirable based upon the measured link quality. On the other hand, if incremental redundancy is employed, using a different MCS may make it impossible to combine the retransmitted block with the originally transmitted block. However, if the link quality changes significantly it still may be desirable to change the MCS even if some of the earlier transmitted data blocks cannot be used in the redundancy combining process at the receiver.

Figure 4A:
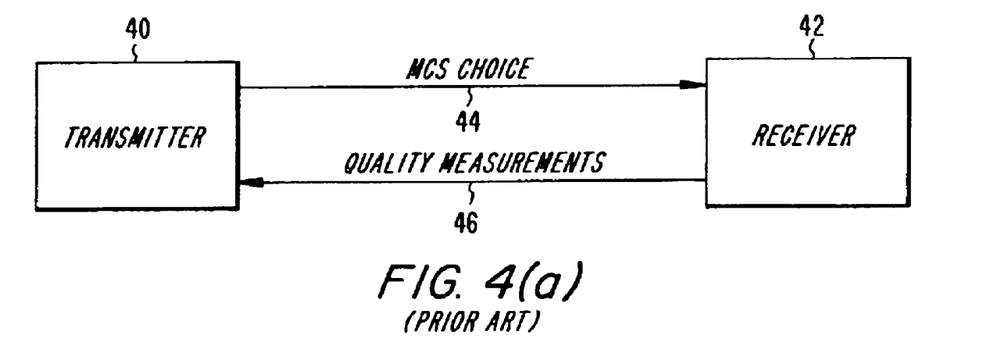
FIGS. 4(a) and 4(b) depict conventional control signalling techniques associated with link adaptation techniques.
Figure 4B:
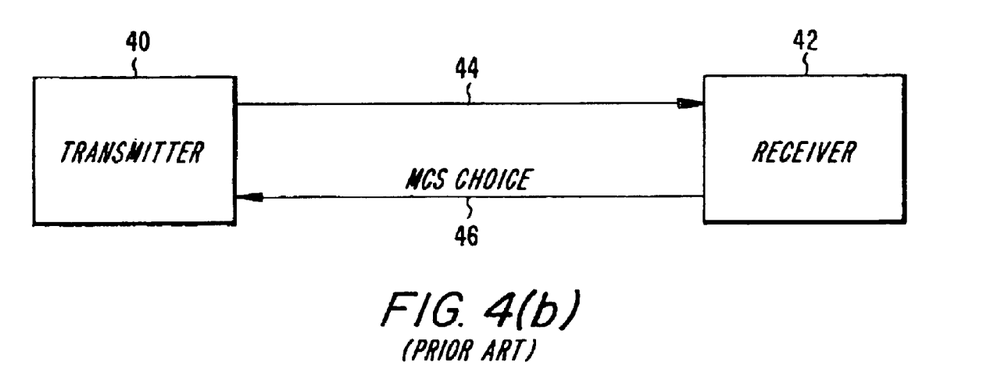

Thus it can be seen that there are many challenges associated with optimizing the manner in which these various techniques are employed. To enable dynamic changing of the MCS during a connection, some form of overhead signalling is necessary between the transmitter and receiver. Conventionally, overhead signalling associated with MCS changes has been performed as illustrated in FIGS. 4(a) and 4(b). In FIG. 4(a), control of MCS changes resides with the transmitting entity 40. Then, the receiving entity 42 makes quality measurements on signals transmitted on the forward link 44. The receiving entity 42 transmits the quality measurements on the reverse link 46 back to the transmitting entity 40, which then determines an appropriate MCS for subsequent block transmissions. This information is then forwarded to the receiving entity 42 so that it is prepared for any changes in the MCS.

Alternatively, control of MCS changes may reside with the receiving entity 42 as shown in FIG. 4(b). Then, the receiving entity 42 makes quality measurements on the forward link as in FIG. 4(a). However, instead of transmitting the quality measurements to the transmitting entity 40, the receiving entity determines if any MCS changes are desirable and forwards such information to the transmitting entity on the reverse link 46.

Both of these conventional signalling techniques have certain drawbacks in the context of systems which can employ both link adaptation and incremental redundancy. Specifically, the signalling technique of FIG. 4(a) suffers from the drawback that the transmitter 40, which is controlling the MCS changes, has no knowledge of the receiver 42's memory status. As mentioned above, without this knowledge, the transmitter cannot properly select an MCS which is appropriate based on both the link quality and the limited memory available to support incremental redundancy combining at the receiver.

Similarly, the conventional technique of FIG. 4(b) also suffers from drawbacks. For example, the conventional MCS choice information transmitted on the reverse link 46 applied only to originally transmitted blocks. As described above, however, it may be desirable for the MCS for originally transmitted blocks and retransmitted blocks to be different.

Accordingly, it would be desirable to provide enhanced techniques for controlling the operation of a radiocommunication system involving link adaptation and incremental redundancy.

SUMMARY

These and other drawbacks and limitations of conventional methods and systems for communicating information are overcome according to the present invention, wherein additional control messages are provided to permit flexible implementation of link adaptation and incremental redundancy techniques. According to a first exemplary embodiment, a message can be transmitted between two entities which informs a transmitting entity whether a receiving entity currently prefers incremental redundancy. For example, if the receiving entity is running out of memory in which to store blocks for incremental redundancy combining, then the receiving entity can signal the transmitting entity using this message. The transmitting entity can, in turn, factor this information into its choice of MCS for subsequent transmissions.

According to another exemplary embodiment of the present invention, another message can be transmitted which informs the transmitting entity whether the receiving entity currently prefers resegementation of retransmitted blocks. If so, then the transmitter may adjust the MCS of retransmitted blocks relative to the MCS used to originally transmit the block which is being retransmitted. Otherwise, if the receiving entity informs the transmitting entity that resegmentation is not preferred, then the transmitting entity can retransmit blocks using the original MCS.

According to one exemplary EGPRS embodiment, the resegmentation message is transmitted in control blocks on the dowlink, while the incremental redundancy message is transmitted in control blocks on the uplink.

BRIEF DESCRIPTION OF THE DRAWINGS

These and other objects, features and advantages of the present invention will become more apparent upon reading from the following detailed description, taken in conjunction with the accompanying drawings, wherein.

DETAILED DESCRIPTION

The following exemplary embodiments are provided in the context of TDMA radiocommunication systems. However, those skilled in the art will appreciate that this access methodology is merely used for the purposes of illustration and that the present invention is readily applicable to all types of access methodologies including frequency division multiple access (FDMA), TDMA, code division multiple access (CDMA) and hybrids thereof.

Moreover, operation in accordance with GSM communication systems is described in European Telecommunication Standard Institute (ETSI) documents ETS 300 573, ETS 300 574 and ETS 300 578, which are hereby incorporated by reference. Therefore, the operation of the GSM system in conjunction with the proposed GPRS optimization for packet data (hereafter referred to simply as "GPRS") is only described herein to the extent necessary for understanding the present invention. Although, the present invention is described in terms of exemplary embodiments in an enhanced GPRS system, those skilled in the art will appreciate that the present invention could be used in a wide variety of other digital communication systems, such as those based on wideband CDMA or wireless ATM, etc.

Figure 5A:
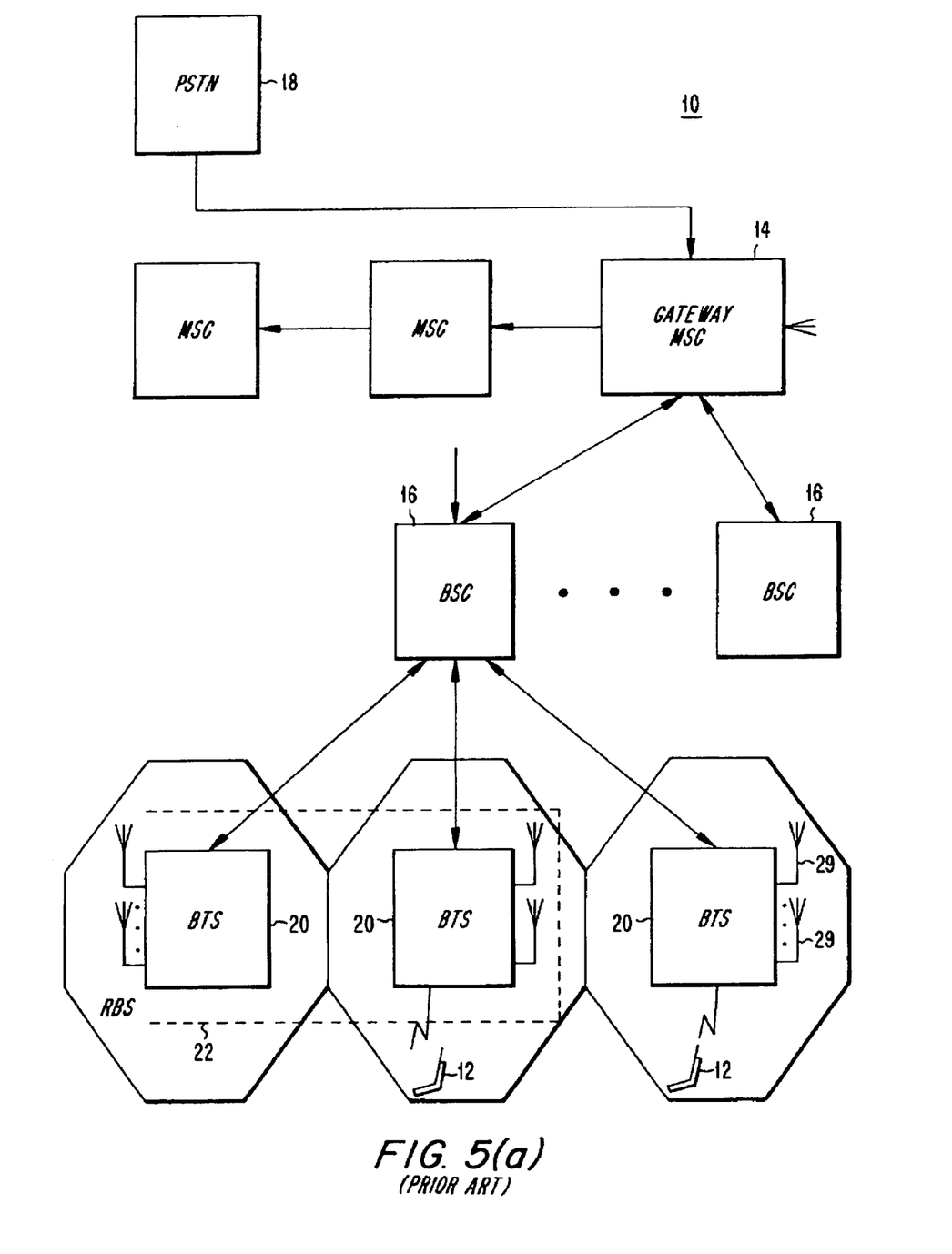
FIG. 5(a) is a block diagram of a GSM communication system which advantageously uses the present invention.

Referring to FIG. 5(a), a communication system 10 according to an exemplary GSM embodiment of the present invention is depicted. The system 10 is designed as a hierarchical network with multiple levels for managing calls. Using a set of uplink and downlink frequencies, mobile stations 12 operating within the system 10 participate in calls using time slots allocated to them on these frequencies. At an upper hierarchical level, a group of Mobile Switching Centers (MSCs) 14 are responsible for the routing of calls from an originator to a destination. In particular, these entities are responsible for setup, control and termination of calls. One of the MSCs 14, known as the gateway MSC, handles communication with a Public Switched Telephone Network (PSTN) 18, or other public and private networks.

At a lower hierarchical level, each of the MSCs 14 are connected to a group of base station controllers (BSCs) 16. Under the GSM standard, the BSC 16 communicates with a MSC 14 under a standard interface known as the A-interface, which is based on the Mobile Application Part of CCITT Signaling System No. 7.

At a still lower hierarchical level, each of the BSCs 16 controls a group of base transceiver stations (BTSs) 20. Each BTS 20 includes a number of TRXs (not shown) that use the uplink and downlink RF channels to serve a particular common geographical area, such as one or more communication cells 21. The BTSs 20 primarily provide the RF links for the transmission and reception of data bursts to and from the mobile stations 12 within their designated cell. When used to convey packet data, these channels are frequently referred to as packet data channels (PDCHs). In an exemplary embodiment, a number of BTSs 20 are incorporated into a radio base station (RBS) 22. The RBS 22 may be, for example, configured according to a family of RBS-2000 products, which products are offered by Telefonaktiebolaget L M Ericsson, the assignee of the present invention. For more details regarding exemplary mobile station 12 and RBS 22 implementations, the interested reader is referred to U.S. patent application Ser. No. 08/921,319, entitled "A Link Adaptation Method For Links using Modulation Schemes That Have Different Symbol Rates", to Magnus Frodigh et al., the disclosure of which is expressly incorporated here by reference.

An advantage of introducing a packet data protocol in cellular systems is the ability to support high data rate transmissions and at the same time achieve a flexibility and efficient utilization of the radio frequency bandwidth over the radio interface. The concept of GPRS is designed for so-called "multislot operations" where a single user is allowed to occupy more than one transmission resource simultaneously.

Figure 5B:
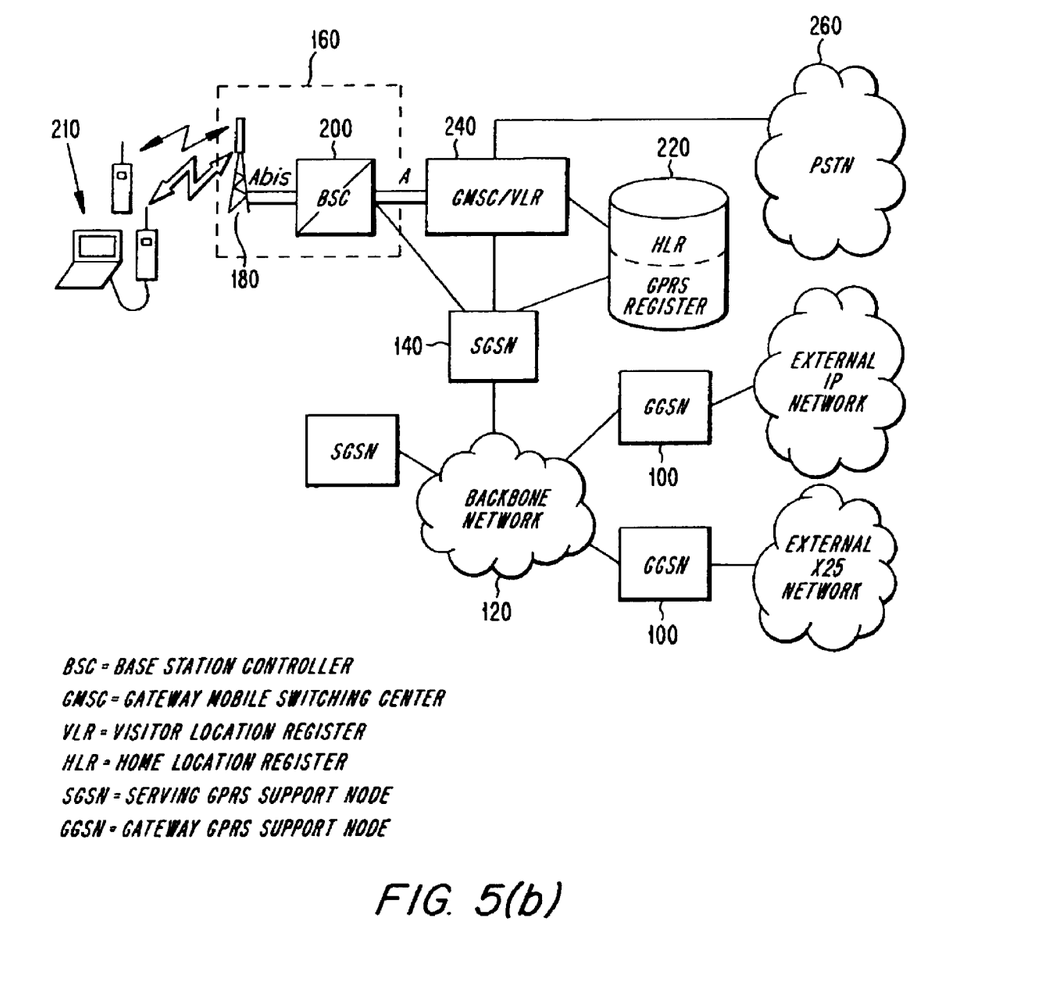
FIG. 5(b) is a block diagram used to describe an exemplary GPRS optimization for the GSM system of FIG. 5(a)

An overview of the GPRS network architecture is illustrated in FIG. 5(b). Since GPRS is an optimization of GSM, many of the network nodes/entities are similar to those described above with respect to FIG. 5(a). Information packets from external networks will enter the GPRS network at a GGSN (Gateway GPRS Service Node) 100. The packet is then routed from the GGSN via a backbone network, 120, to a SGSN (Serving GPRS Support Node) 140, that is serving the area in which the addressed GPRS mobile resides. From the SGSN 140 the packets are routed to the correct BSS (Base Station System) 160, in a dedicated GPRS transmission. The BSS includes a plurality of base transceiver stations (BTS), only one of which, BTS 180, is shown and a base station controller (BSC) 200. The interface between the BTSs and the BSCs are referred to as the A-bis interface. The BSC is a GSM specific denotation and for other exemplary systems the term Radio Network Control (RNC) is used for a node having similar functionality as that of a BSC. Packets are then transmitted by the BTS 180 over the air interface to a remote unit 210 using a selected information transmission rate.

A GPRS register will hold all GPRS subscription data. The GPRS register may, or may not, be integrated with the HLR (Home Location Register) 220 of the GSM system. Subscriber data may be interchanged between the SGSN and the MSC/VLR 240 to ensure service interaction, such as restricted roaming. As mentioned above, the access network interface between the BSC 200 and MSC/VLR 240 is a standard interface known as the A-interface, which is based on the Mobile Application Part of CCITT Signaling System No. 7. The MSC/VLR 240 also provides access to the land-line system via PSTN 260.

According to exemplary embodiments of the present invention, as conceptually illustrated in FIGS. 6(a)–6(h), one or more additional overhead messages can be provided in the signalling between the receiving entity 600 (e.g., RBS 180 or MS 210) and the transmitting entity 610 (e.g., MS 210 or RBS 180). These messages, referred to as LA/IR and RSEG/NRSEG in FIGS. 6(a)–6(h) are shown as portions of control blocks which are transmitted periodically from each entity (or upon request) and which also include other messages, e.g., acknowledgement reports. Note that, although these messages are illustrated as being individually transmitted in one link in FIGS. 6(a)–6(h), those skilled in the art will appreciate that both, one or none of these messages can be selectively added to the control blocks transmitted in each link as will be more apparent below. Moreover, although the following discussion is from the perspective of the link 630, those skilled in the art will appreciate that it applies equally to link 620.

The LA/IR message provides an explicit request of the preferred operating mode, i.e., either link adaptation or incremental redundancy. This message can be included in a control block in addition to the link quality measurements or MCS command described above with respect to FIGS. 4(a) or 4(b). This information can then be used by the other entity when selecting from two predetermined rules or rule sets for changing the MCS.

Figure 6A:
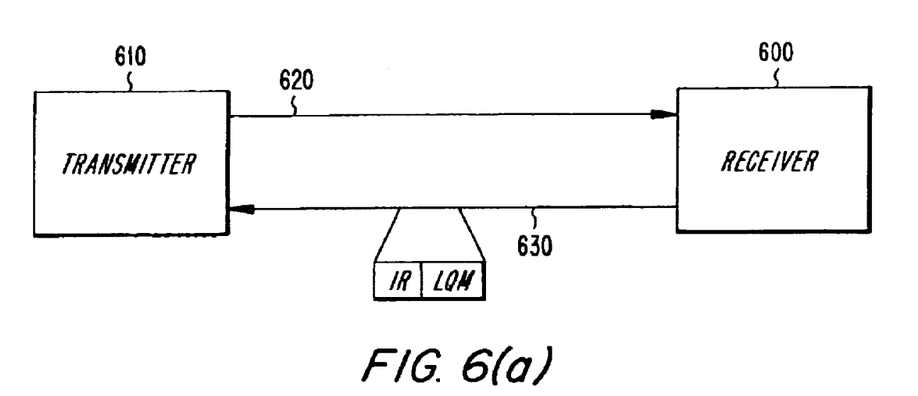
FIGS. 6(a)–6(d) describe exemplary embodiments of the present invention including a message field which indicates whether or not incremental redundancy is currently employed at a receiving entity.

For example, as seen in FIG. 6(a) if the receiving entity 600 transmits the LA/IR message field on link 620 (along with link quality measurements(LQM)) with a value which indicates that incremental redundancy is preferred, this implies that it currently has adequate memory capacity to continue to store blocks to support incremental redundancy combining. This informs the transmitting entity 610 that it can employ an MCS rule or rule set that makes, for example, aggressive (i.e., less robust) MCS choices, taking the link quality estimate report which is also transmitted to the transmitting entity 610 into account.

Figure 6B:
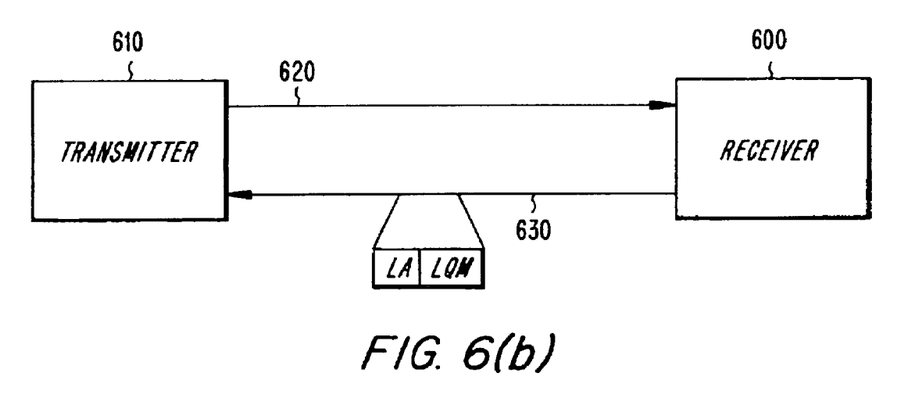

Alternatively, as seen in FIG. 6(b), the LA/IR message may instead have a value which indicates that link adaptation is preferred by receiving entity 600. This may imply, for example, that the receiving entity 600 lacks available memory and, therefore, cannot rely on incremental redundancy combining. When it receives this message, transmitting entity 600 may then switch to a second MCS rule or rule set that makes more conservative (i.e., more robust) MCS choices, based on the link quality estimates, to ensure that the receiver achieves sufficient performance without the incremental redundancy combining.

Figure 6C:
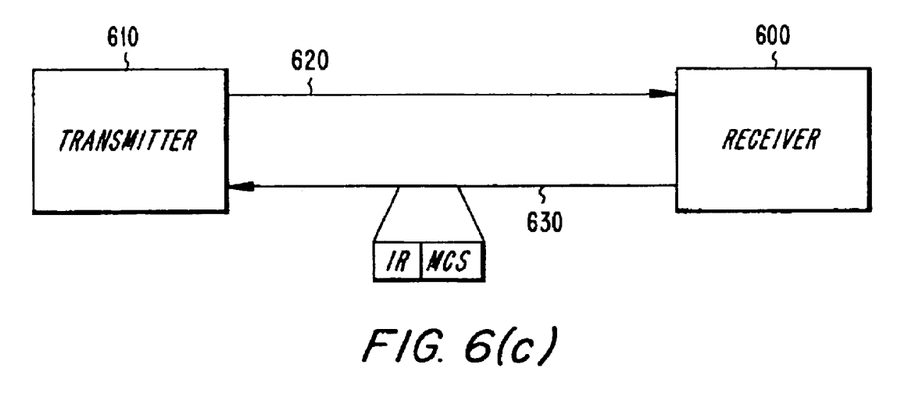

If the LA/IR message is included with an MCS command instead of the link quality estimates, then there are again two possibilities. First, as seen in FIG. 6(c), the receiving entity 600 can transmit the LA/IR message with a value indicating that incremental redundancy is preferred. This implies that the controlling entity (i.e., the receiver 600 in this example) has chosen the MCS (as signaled in the MCS command which is transmitted along with the LA/IR message) based upon the fact that incremental redundancy will be performed. Thus, the non-controlling party will note that IR combining is being performed and, therefore, shall provide retransmissions using the same MCS as the initial transmissions. Of course, for the new transmissions, the MCS identified in the MCS command should be used.

Figure 6D:
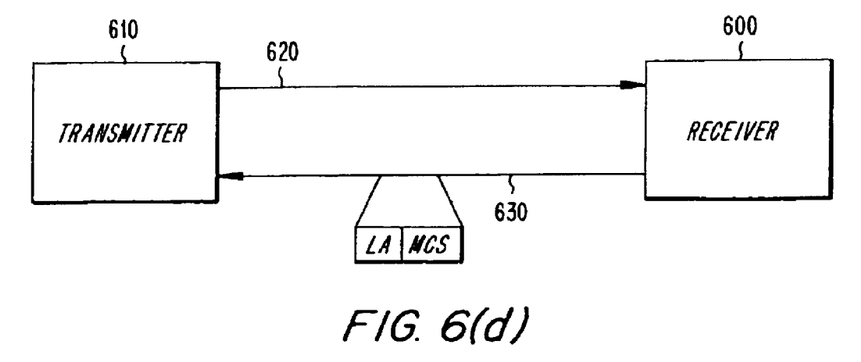

Second, the receiving entity 600 can transmit the LA/IR message with a value indicating that incremental redundancy is not available at the receiving entity as seen in FIG. 6(d). Thus, the non-controlling party will note that incremental redundancy combining is not being performed and, therefore, shall preferably provide retransmissions using the same, or close to the same, MCS as is currently employed for new block transmissions. Again, for the new transmissions, the MCS identified in the MCS command should be used.

Figure 6E:
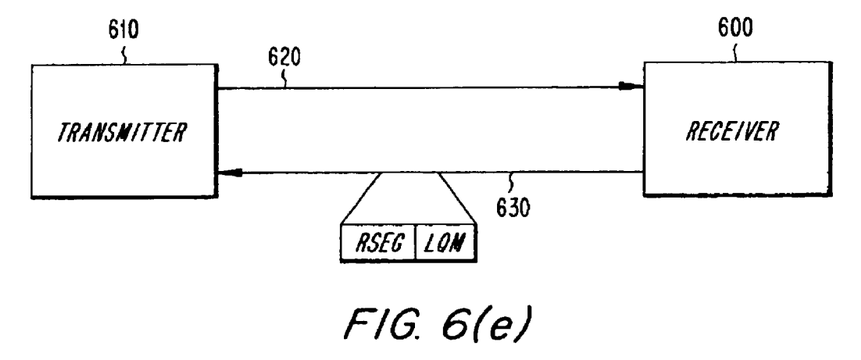
FIGS. 6(e)–6(h) depict exemplary embodiments of the present invention including a message field which indicates whether or not resegmentation of retransmitted blocks is to be performed.

As a second message, receiving entity 600 can also inform transmitting entity 610 whether or not retransmissions should be made with resegmented blocks, i.e., whether the MCS for retransmissions should be the same or different than the MCS for new block transmissions, using the RSEG/NRSEG message. As with the foregoing examples which provide the LA/IR message, the RSEG/NRSEG message can be transmitted with either link quality measurements or MCS commands. For example, as shown in FIG. 6(e), if the RSEG message has a value which indicates that resegmentation should be used, then the transmitting entity 600 will know that a more (or less) robust MCS can be selected for retransmitting not acknowledged blocks than was used to originally transmit those blocks to receiving entity 600. The original MCS can be varied based on the link quality measurements reported on link 630, taking into account that a more robust MCS has been requested for the retransmissions (which fact may be used by transmitting entity 610 to increase the MCS for original transmissions as well).

Figure 6F:
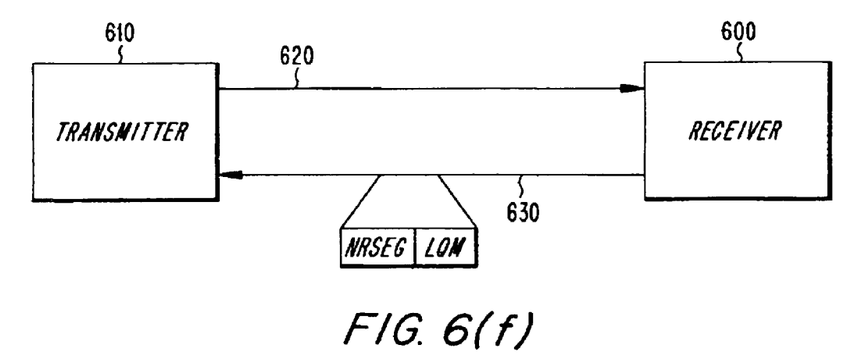

Alternatively, if the RSEG/NRSEG message indicates that resegmentation of the blocks is not preferred (FIG. 6(f)), then the transmitting entity 610 will perform retransmissions with the same MCS as the initial transmissions. This may also be taken as an indication by transmitting entity 600 that the prevailing MCS can continue to be used for new block transmissions, based also on the link quality measurements.

Figure 6G:
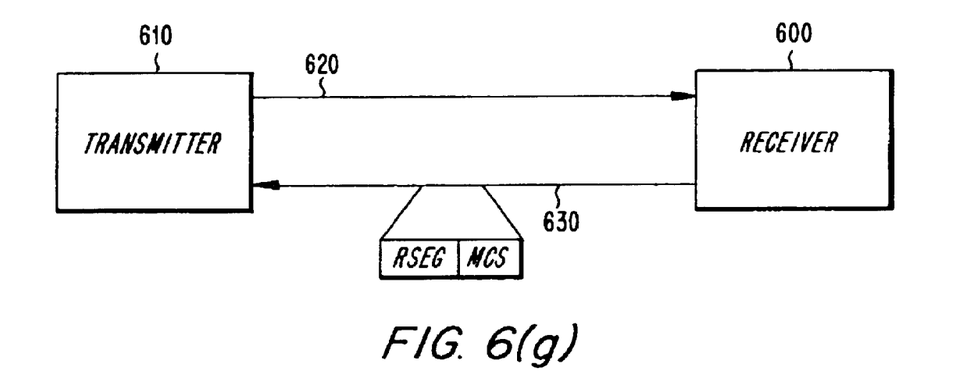
Figure 6H:
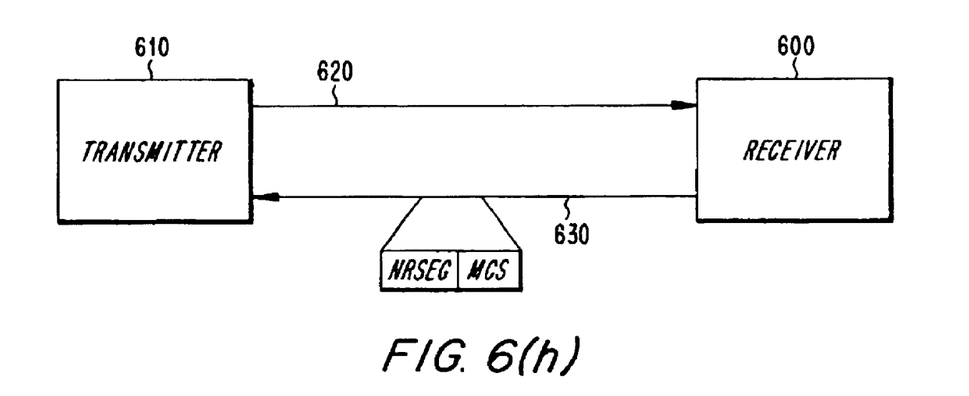

As with the LA/IR messages, the RSEG/NRSEG message can also be transmitted with MCS commands instead of link quality measurements. For example, as seen in FIG. 6(g), if the RSEG value is transmitted, then the transmitting entity 610 will use a more robust MCS to retransmit a resegmented version of unacknowledged blocks. The MCS for originally transmitted blocks is then dictated by the MCS command. As seen in FIG. 6(h), if the NRSEG value is transmitted, then the transmitting entity will use the same MCS value for retransmitted blocks and will use the MCS indicated in the MCS command for new transmissions.

These types of additional control fields permit the receiving and transmitting entities to communicate changes associated with the transmission of original blocks and retransmitted blocks that enable the link adaptation, incremental redundancy and resegmentation techniques to be used optimally together. As mentioned above, the LA/IR and RSEG/NRSEG messages may be provided together on both links, separately on either link or in any other combination desirable. Consider, for example, another exemplary implementation for the enhanced GPRS system described above.

Figure 7:
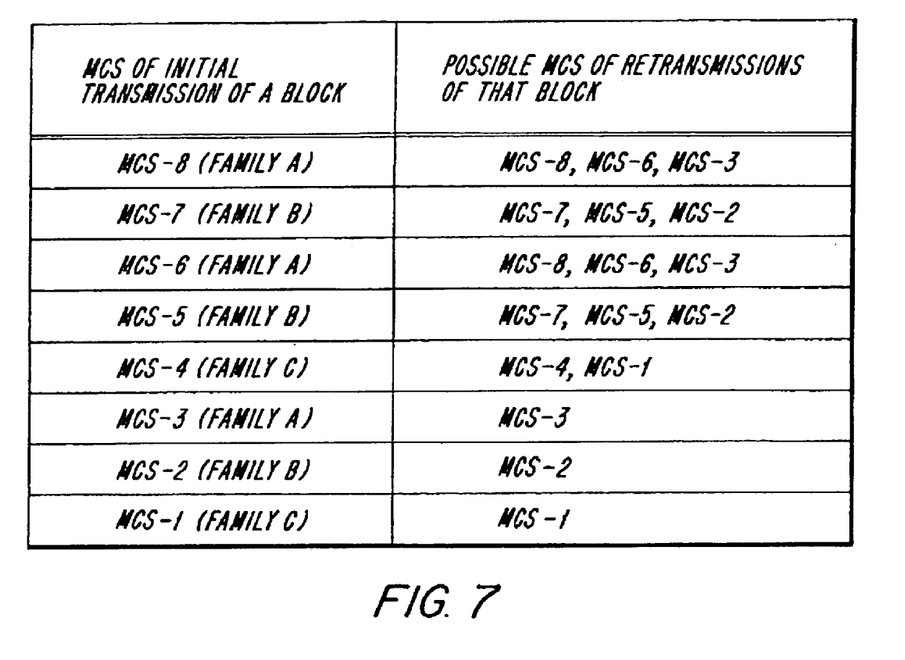
FIG. 7 is a table illustrating exemplary relationships between the MCS for an originally transmitted block and a corresponding, retransmitted block.

For Enhanced GPRS (EGPRS), i.e., the packet switched services of EDGE, there are proposed to be eight MCSs, denoted MCS-1 (most robust) through MCS-8 (least robust). As for GPRS, the network will control he MCS choices, i.e., the mobile station reports downlink quality estimates in the uplink, and the network gives uplink MCS commands to the mobile station in the downlink. Block acknowledgments are signaled in both links in so-called Control Blocks. The above mentioned quality reports and MCS commands are included in these Control Blocks. Unlike GPRS, EGPRS allow changes of the MCSs for retransmissions with certain constraints as seen in FIG. 7. For new block transmissions, any MCS can be used. Under these conditions, the messages described above according to the present invention can be used as follows.

Figure 8:
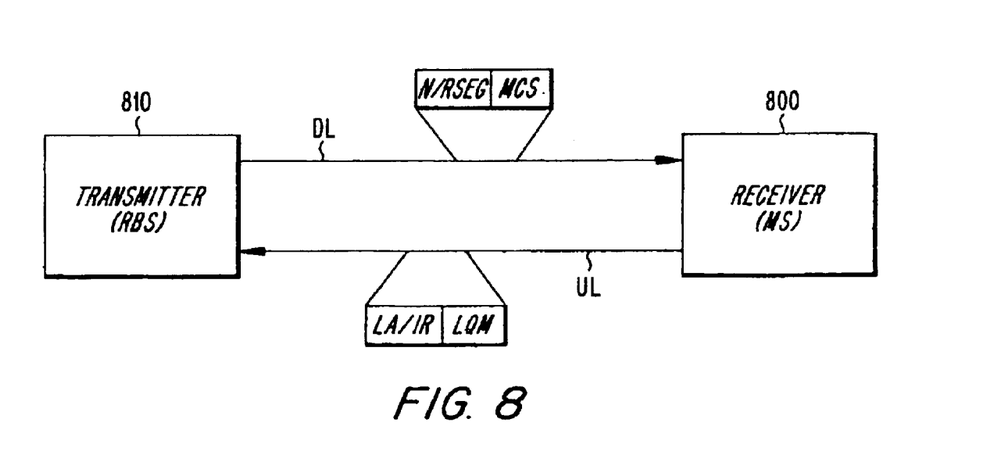
FIG. 8 is an exemplary EGPRS embodiment of the present invention.

Referring now to FIG. 8, in the uplink control blocks, the downlink quality estimate is signaled. The inventive LA/IR message is introduced, for example by using an additional bit flag in the control word. The network's interpretation is that if the IR value is signaled, incremental redundancy operation is possible for the mobile station 800 and the network (as represented by RBS 810)can be very aggressive when choosing an MCS, since it can rely on the fact that the mobile station 800 uses IR combining. If, on the other hand, the LA value is signaled in this field of the uplink control block, then IR operation is not possible for mobile station 800, and hence the network should take this into account when choosing an MCS, i.e., by choosing a more robust MCS.

In the downlink, the control blocks include an MCS command is signaled, which tells the mobile station 800 which MCS (e.g., of those shown in FIG. 7) should be used for transmitting uplink RLC blocks. The RSEG/NRSEG message can also be added to the downlink control blocks, e.g., using a bit flag. In this context, an NRSEG value can be interpreted by the mobile station 800 as meaning retransmissions by the mobile station use the same MCSs as the initial transmissions of those blocks. A RSEG value, on the other hand, should be interpreted by mobile station 800 as meaning that blocks to be retransmitted should be resegmented and transmitted using different (e.g., more robust) MCSs than the initial MCSs of those blocks.

In the latter case, the specific MCS to use for retransmissions can be determined by a predetermined rule stored in the mobile station. This rule could be, purely for example, that:

"Resegment to the same MCS as the MCS commanded for new transmissions, if possible. If not possible, resegment to the least robust MCS that is more robust than the commanded MCS. If still not possible, resegment to the most robust MCS as possible." This would mean that in some cases, the MCS for retransmissions is less robust than the MCS for the original transmission.

Another rule could be the same as above with the addition that "If the MCS determined according to the above rule is less robust than the initial one, use the initial one instead". This way the MCS can only be more robust (or the same) for the retransmissions.

For some cases, it is possible to change the MCS for retransmissions without losing old IR information. This applies for changes between MCS-8 and MCS-6, and for changes between MCS-7 and MCS-5. Hence those transitions could be allowed, even if resegmentation is not allowed for other retransmissions. Thus, even if NRSEG is indicated in the downlink control block, retransmissions for blocks originally transmitted using MCS-8 or MCS-7 can be performed using MCS-6 or MCS-5, respectively, if the ordered MCS is lower or equal to MCS-8 or MCS-7, respectively. Alternatively, the NRSEG value can be controlling. If desired, the RSEG/NRSEG flag can be extended to two bits, one indicating the RSEG/NRSEG value and one indicating whether NRSEG is valid for all MCSS.

Thus, it can be seen that the present invention provides for increase flexibility of the modulation and coding scheme choices in systems using link adaptation and Incremental Redundancy. Moreover, the strategy for the link adaptation algorithm will be more sensitive to whether incremental redundancy can/should be used at each moment, and does not have to sacrifice performance in either case. The link adaptation protocol will be more robust to memory problems in the receivers, i.e., when there is no or little memory available for incremental redundancy operation, this is taken into account in the algorithms. The present invention also makes it more likely that protocol stalling and unnecessarily large performance degradations can be avoided.

Although the invention has been described in detail with reference only to a few exemplary embodiments, those skilled in the art will appreciate that various modifications can be made without departing from the invention. Accordingly, the invention is defined only by the following claims which are intended to embrace all equivalents thereof.

What is claimed is:

1. A method of transferring information between a transmitting entity and a receiving entity comprising the steps of:

identifying an initial modulation/coding scheme (MCS) in a command sent from the receiving entity to the transmitting entity;

encoding initial blocks at data utilizing the identified initial MCS;

transmitting the encoded initial blocks of data from the transmitting entity to the receiving entity;

receiving indications sent from the receiving entity to the transmitting entity identifying initial blocks of data that could not be decoded;

receiving a segmentation indicator sent from the receiving entity to the transmitting entity indicating whether the identified data blocks that the receiving entity could not decode should be resegmented by the transmitting entity prior to retransmission to the receiving entity, wherein the segmentation indicator is set to indicate that retransmitted data blocks should not be resegmented if a subblock memory in the receiving entity has sufficient memory space available to support an incremental redundancy mode of retransmitting the data blocks that could not be decoded;

selecting by the transmitting entity, a retransmission MCS to be utilized for retransmitting the data blocks that the receiving entity could not decode;

if the selected retransmission MCS is different from the initial MCS, re-encoding by the transmitting entity utilizing the selected retransmission MCS, the data blocks that the receiving entity could not decode; and retransmitting the re-encoded data blocks to the receiving entity, said retransmitted data blocks being resegmented or not resegmented in accordance with the segmentation indicator.

2. The method of claim 1, wherein the step of sending the segmentation indicator includes sending at least one link quality measurement from the receiving entity to the transmitting entity.

3. The method of claim 1, wherein the receiving entity sets the segmentation indicator to indicate that retransmitted data blocks should be resegmented if a subblock memory in the receiving entity does not have sufficient memory space available to support an incremental redundancy mode of retransmitting the data blocks that could not be decoded.

4. The method of claim 1, wherein the selecting step includes the steps of:

selecting the retransmission MCS according to a first predetermined rule if the segmentation indicator indicates that the retransmitted data blocks are not to be resegmented; and selecting the retransmission MCS according to a second predetermined rule if the segmentation indicator indicates that the retransmitted data blocks are to be resegmented.

5. The method of claim 4, wherein the selecting step includes the steps of:

selecting the initial MCS used for the initial transmission of the data blocks, or another MCS that does not require resegmentation of the block of data, if the segmentation indicator indicates that the retransmitted data blocks are not to be resegmented; and selecting an MCS that may be more robust or less robust then the initial MCS, and may require resegmentation of the initial blocks of data, if the segmentation indicator indicates that the retransmitted data blocks are to be resegmented.

6. The method of claim 1, further comprising the steps of:

measuring, by the receiving entity, a quality level of a link between the transmitting entity and the receiving entity; and sending from the receiving entity to the transmitting entity, at least one link quality indicator indicating the quality level of the link;

wherein the step of selecting by the transmitting entity, a retransmission MCS includes selecting a retransmission MCS based upon the link quality indicator and the segmentation indicator.

7. A receiver for receiving encoded subblocks of data and providing decoded data blocks to an end user, said receiver comprising:

a subblock memory for storing received initial subblocks of data that the receiver could not decode;

a receive buffer for storing successfully decoded data blocks;

a decoder for decoding the received initial subblocks of data and determining whether any of the received initial subblocks of data cannot be decoded, said decoder storing the subblocks of data that cannot be decoded in the subblock memory, and passing the decoded data blocks to the receive buffer;

means for determining whether the subblock memory has sufficient memory space available for the receiver to utilize an incremental redundancy operating mode to obtain additional redundant subblocks of data for additional attempts to decode the initial subblocks of data that could not be decoded, wherein, in the incremental redundancy operating mode, additional redundant subblocks of data associated with the initial subblocks of data that could not be decoded are repeatedly retransmitted to the receiver until the receiver successfully decodes the subblocks of data that could not be decoded, said receiver combining the additional redundant subblocks of data with the initial subblocks of data in the subblock memory, and utilizing a joint decoding process; and means for transmitting a message to a transmitter indicating a preferred operating mode, said message indicating that the preferred operating mode is the incremental redundancy mode if the subblock memory has sufficient memory space available to store the received initial subblocks of data as well as the additional redundant subblocks of data, and said message indicating that the preferred operating mode is a non-incremental redundancy mode if the subblock memory does not have sufficient memory space to utilize the incremental redundancy operating mode.

8. The receiver of claim 7, wherein the received initial subblocks of data and the additional redundant subblocks of data are stored in the subblock memory when the incremental redundancy operating mode is being utilized, and the decoder combines and jointly decodes the stored subblocks of data.

9. A method of transferring information between a transmitting entity and a receiving entity comprising the steps of:

encoding blocks of data utilizing an initial modulation/coding scheme (MCS), thereby generating encoded data blocks;

generating from each of the encoded data blocks, at least one initial subblock of data, each initial subblock containing all or a subset of the bits of the encoded data block;

transmitting for each of the encoded data blocks, the initial subblocks of data from the transmitting entity to the receiving entity;

receiving and attempting to decode by the receiving entity, the encoded initial subblocks of data;

storing the encoded initial subblocks of data that cannot be decoded in a subblock memory at the receiving entity;

determining, at the receiving entity, whether the subblock memory of the receiving entity will support reception of additional redundant subblocks of data utilizing an incremental redundancy mode in which the additional redundant subblocks are repeatedly retransmitted to the receiving entity and stored in the subblock memory until the receiving entity successfully decodes the initial subblocks of data in a joint decoding process with the additional redundant subblocks; and sending a mode preference indicator from the receiving entity to the transmitting entity, said mode preference indicator indicating whether or not operation in the incremental redundancy mode is preferred, said incremental redundancy mode being preferred if the subblock memory of the receiving entity will support reception of additional redundant subblocks of data utilizing the incremental redundancy mode.

10. The method of claim 9, further comprising measuring, by the receiving entity, a quality level of a link between the transmitting entity and the receiving entity, and wherein the step of sending the mode preference indicator includes sending from the receiving entity to the transmitting entity, at least one link quality indicator indicating the quality level of the link.

11. The method of claim 9, further comprising, after receiving and attempting to decode the initial subblocks of data at the receiving entity, the step of determining at the receiving entity whether any of the data blocks cannot be decoded from the received initial subblocks of data, and wherein, the step of determining whether the subblock memory of the receiving entity will support reception of additional redundant subblocks includes, upon determining that at least one of the initial subblocks of data cannot be decoded, determining whether the subblock memory of the receiving entity will support reception of additional redundant subblocks of data containing additional redundant bits of the subblocks of data that cannot be decoded.

12. The method of claim 9, further comprising the steps of:
if the mode preference indicator indicates that operation in the incremental redundancy mode is preferred, selecting an MCS for encoding and generating the additional redundant subblocks taking into account that the receiving entity can perform joint decoding of an initial subblock with its associated additional redundant subblocks of data; and
if the mode preference indicator indicates that operation in the incremental redundancy mode is not preferred, selecting the MCS for encoding and generating the additional redundant subblocks taking into account that the receiver cannot perform joint decoding of an initial subblock with its associated additional redundant subblocks of data, but must decode the data block that could not be decoded utilizing a single additional redundant subblock of data.

13. The method of claim 12, wherein the steps of selecting an MCS for encoding the additional subblocks are performed at the transmitting entity based upon the mode preference indicator received from the receiving entity.

14. The method of claim 12, further comprising measuring, by the receiving entity, a quality level of a link between the transmitting entity and the receiving entity, and sending a link quality indicator to the transmitting entity, wherein the steps of selecting an MCS for encoding the additional subblocks are performed at the transmitting entity and are based upon the made preference indicator and the link quality indicator received from the receiving entity.

15. The method of claim 12, wherein the steps of selecting an MCS for encoding and generating the additional redundant subblocks also include selecting an MCS for encoding future initial subblocks of data to be transmitted from the transmitting entity to the receiving entity.

16. The method of claim 12, wherein the steps of selecting an MCS for encoding the additional subblocks are performed at the receiving entity, and the step of sending the mode preference indicator to the transmitting entity includes sending a selected MCS to the transmitting entity for encoding the additional subblocks of data.

17. The method of claim 16, wherein said transmitting entity encodes new data blocks utilizing a first MCS based on the selected MCS received from the receiving entity, and encodes the additional redundant subblocks of data utilizing a second MCS based on the mode preference indicator.

18. A method in a receiver of selecting an operating mode utilized by a remote transmitter to transmit encoded subblocks of data to the receiver, said operating mode being selected from at least two different operating modes, said method comprising the steps of:
receiving and attempting to decode initial subblocks of data;
storing in a subblock memory, received initial subblocks of data that could not be decoded;
determining whether the subblock memory has sufficient memory space available for the receiver to utilize an incremental redundancy operating mode to obtain additional redundant subblocks of data;
sending a message to the transmitter indicating that the incremental redundancy operating mode is preferred, upon determining that the subblock memory has sufficient memory space available to utilize the incremental redundancy operating mode; and
sending a message to the transmitter indicating that a non-incremental redundancy operating mode is preferred, upon determining that the subblock memory does not have sufficient memory space available to utilize the incremental redundancy operating mode.

19. The method of claim 18, wherein the message to the transmitter indicates that the incremental redundancy operating mode is preferred, and the method further comprises the steps of:
receiving additional redundant subblocks of data by the receiver;
storing the received additional redundant subblocks of data with the initial subblocks of data in the subblock memory; and
utilizing a joint decoding process to combine and decode the stored initial subblocks of data and additional redundant subblocks of data.

20. A method in a transceiver for encoding blocks of data and transmitting said encoded data blocks to an external receiver, said method comprising the steps of:
encoding blocks of data utilizing an initial modulation/coding scheme (MCS), thereby generating encoded data blocks;
generating from each of the encoded data blocks, at least one initial subblock of data, each initial subblock containing all or a subset of the bits of the encoded data block;
transmitting for each of the encoded data blocks, the initial subblocks of data to the external receiver;
receiving a message from the external receiver identifying subblocks of data that the receiver could not decode;
receiving a message from the external receiver indicating a preferred operating mode for retransmitting to the receiver, the identified subblocks as additional redundant subblocks of data, wherein the preferred operating mode for retransmitting the identified subblocks is indicated as being an incremental redundancy mode if a subblock memory in the receiving entity has sufficient memory space available to support the incremental redundancy mode;

encoding the additional redundant subblocks of data utilizing an MCS appropriate for the preferred operating mode indicated in the message from the receiver; and transmitting the encoded additional redundant subblocks of data to the external receiver utilizing the preferred operating mode and utilizing the MCS appropriate for the preferred operating mode.

21. The method of claim 20, wherein the step of encoding the additional redundant subblocks of data includes encoding the additional redundant subblocks of data with an MCS appropriate for joint decoding of an initial subblock with its associated additional redundant subblocks, if the message from the external receiver indicates that the preferred operating mode is an incremental redundancy mode.

22. The method of claim 20, wherein the step of encoding the additional redundant subblocks of data includes encoding the additional redundant subblocks of data with an MCS appropriate for decoding utilizing a single additional redundant subblock of data, if the message from the external receiver indicates that the preferred operating mode is a non-incremental redundancy mode.

23. The method of claim 20 wherein the steps of selecting an MCS for encoding the additional redundant subblocks also include selecting an MCS for encoding future initial subblocks of data to be transmitted from the transmitting entity to the receiving entity.

24. A transceiver for encoding blocks of data and transmitting said encoded data blocks to an external receiver, said transceiver comprising:

an encoder for encoding blocks of data utilizing a modulation/coding scheme (MCS) selected from a plurality of MCSs that the encoder is capable of utilizing;

means for generating from each of the encoded data blocks, at least one initial subblock of data, each initial subblock containing all or a subset of the bits of the encoded data block;

means for transmitting the initial subblocks of data to the external receiver, and if required, transmitting additional redundant subblocks of data to the receiver;

means for receiving a message from the external receiver identifying subblocks of data that the receiver could not decode;

means for receiving a message from the external receiver indicating a preferred operating mode for retransmitting to the receiver, the identified subblocks as additional redundant subblocks of data, wherein the preferred operating mode for retransmitting the identified subblocks is indicated as being an incremental redundancy mode if a subblock memory in the receiving entity has sufficient memory space available to support the incremental redundancy mode; and means within the encoder for encoding the additional redundant subblocks of data utilizing an MCS appropriate for the preferred operating mode indicated in the message from the receiver, and providing the encoded additional redundant subblocks of data to the transmitting means for transmission to the external receiver utilizing the preferred operating mode and utilizing the MCS appropriate for the preferred operating mode.

25. The transceiver of claim 24, wherein the steps of selecting an MCS for encoding the additional redundant subblocks also include selecting an MCS for encoding future initial subblocks of data to be transmitted from the transmitting entity to the receiving entity.

26. A method of transferring information between a transmitting entity and a receiving entity comprising the steps of:

identifying an initial modulation/coding scheme (MCS) in a command sent from the receiving entity to the transmitting entity;

encoding by the transmitting entity, initial blocks of data utilizing the identified initial MCS, thereby generating encoded initial subblocks of data;

transmitting the encoded initial subblocks of data from the transmitting entity to the receiving entity;

at the receiving entity, receiving and attempting to decode the encoded initial subblocks of data;

sending indications from the receiving entity to the transmitting entity identifying initial subblocks of data that could not be decoded;

sending a segmentation indicator from the receiving entity to the transmitting entity indicating whether the identified subblocks of data that the receiving entity could not decode should be resegmented by the transmitting entity prior to retransmission to the receiving entity, wherein the receiving entity sets the segmentation indicator to indicate that retransmitted data blocks should not be resegmented if a subblock memory in the receiving entity has sufficient memory space available to support an incremental redundancy mode of retransmitting the data blocks that could not be decoded;

selecting by the receiving entity, a retransmission MCS to be utilized by the transmitting entity for retransmitting the subblocks of data that the receiving entity could not decode;

sending the selected retransmission MCS from the receiving entity to the transmitting entity;

if the selected retransmission MCS is different from the initial MCS, re-encoding by the transmitting entity utilizing the selected retransmission MGS, the subblocks of data that the receiving entity could not decode; and retransmitting the re-encoded subblocks of data to the receiving entity, said retransmitted data blocks being resegmented or not resegmented in accordance with the segmentation indicator.

27. The method of claim 26, wherein the segmentation indicator and the retransmission MCS are sent from the receiving entity to the transmitting entity in a single message.

28. The method of claim 26, further comprising, before sending the segmentation indicator from the receiving entity to the transmitting entity, the step of determining by the receiving entity whether a subblock memory in the receiving entity has sufficient memory space available for the receiving entity to utilize an incremental redundancy operating mode to obtain additional redundant subblocks of data, wherein the step of sending a segmentation indicator from the receiving entity to the transmitting entity includes sending a segmentation indicator indicating that the identified data blocks should not be resegmented, upon determining that the subblock memory in the receiving entity has sufficient memory space available for the receiving entity to utilize the incremental redundancy operating mode.

* * * * *

UNITED STATES PATENT AND TRADEMARK OFFICE
CERTIFICATE OF CORRECTION

PATENT NO. : 6,865,233 B1 Page 1 of 1
APPLICATION NO. : 09/252989
DATED : March 8, 2005
INVENTOR(S) : Stefan Eriksson et al.

It is certified that error appears in the above-identified patent and that said Letters Patent is hereby corrected as shown below:

In Column 10, Line 39, delete "MCSS" and insert -- MCSs --, therefor.

In Column 13, Line 64, in Claim 14, delete "made" and insert -- mode --, therefor.

In Column 16, Line 40, in Claim 26, delete "MGS" and insert -- MCS --, therefor.

Signed and Sealed this

Thirtieth Day of October, 2007

JON W. DUDAS
*Director of the United States Patent and Trademark Office*